United States Patent [19]

Horng

[11] Patent Number: 4,987,331

[45] Date of Patent: Jan. 22, 1991

[54] NON-BRUSH D.C. MOTOR WITH AN IMPROVED STATOR

[76] Inventor: Alex Horng, No. 149, Yi-Yung Rd., Kaohsiung City, Taiwan, 800

[21] Appl. No.: 319,288

[22] Filed: Mar. 6, 1989

[51] Int. Cl.⁵ .......................... H02K 1/12; H02K 1/00; H02K 3/00; H02K 11/00

[52] U.S. Cl. ...................................... 310/254; 310/43; 310/67 R; 310/152; 310/179; 310/194

[58] Field of Search .......... 310/40 MM, 43, 46, 49 A, 310/67 R, 152, 177, 179, 181, 194, 254, 257, 258, DIG. 6

[56] References Cited

U.S. PATENT DOCUMENTS

| | | | |
|---|---|---|---|
| 2,709,228 | 5/1955 | Miller et al. | 310/90 |
| 2,804,557 | 8/1957 | Roters | 310/90 |
| 3,131,323 | 4/1964 | Roters et al. | 310/90 |
| 4,329,606 | 5/1982 | Montagu | 310/67 R |
| 4,701,653 | 10/1987 | Merkle et al. | 310/152 |
| 4,779,330 | 10/1988 | Genco et al. | 310/71 |
| 4,783,608 | 11/1988 | Gruber | 310/43 |
| 4,823,034 | 4/1989 | Wrobel | 310/67 R |
| 4,841,190 | 6/1989 | Matsushita et al. | 310/43 |
| 4,934,041 | 6/1990 | Hoover et al. | 310/71 |

FOREIGN PATENT DOCUMENTS 0299512  1/1989  European Pat. Off. ............ 310/177

Primary Examiner—Steven L. Stephan
Assistant Examiner—C. LaBalle
Attorney, Agent, or Firm—Fleit, Jacobson, Cohn, Price, Holman & Stern

[57] ABSTRACT

A non-brush D.C. motor with an improved stator which is constituted by a base (1) made of plastics having sides, a coil winding (11) around the outer round circumference of the base, two magnetic poles each formed of a pair of polar plates (2,3) respectively fixed at both sides of the base and a circuit board connected at one side of the base with one pair of polar plates between the circuit board and the one side of the base.

1 Claim, 2 Drawing Sheets

NON-BRUSH D.C. MOTOR WITH AN IMPROVED STATOR

BACKGROUND OF THE INVENTION

Conventional non-brush D.C. motors comprise a stator having four poles formed as a cross, and a round hole at its center. Each pole is shaped as a T letter and almost round for its circumference, and a coil is wound around each arm of the poles. Then the stator is firmly fixed on a circuit board. Nevertheless, the cost of such a stator is expensive because of its material and structure, and in addition, an insulating process is required in the stator of a conventional D.C. motor, which process is liable to cause environmental pollution because varnish is used for the insulating.

SUMMARY OF THE INVENTION

In view of the disadvantage of a conventional non-brush D.C. motor, the object of this invention is to provide a non-brush D.C. motor which is easy to assemble, and non polluting to the environment in manufacturing its stator.

This non-brush D.C. motor with an improved stator in accordance with the present invention comprises a base with a coil wound on its outer circumference, two magnetic polar plates, a metal cylinder, a bearing, a circuit board and a rotor as its main parts.

The base is provided with a round outer circumference wound by a coil, two sides respectively combined firmly with a magnetic polar plate by means of two feet extending out of each side face of the base and holes in each magnetic polar plate, and a central opening to receive the metal cylinder.

The central opening of the metal cylinder is to be passed through by a cylindrical bearing having a shaft hole for the shaft of the rotor to pass through.

The circuit board is to fix thereon electronic components to start this motor, and combined at the right side of the right magnetic polar plate.

The rotor is provided with a shaft passing through the shaft hole of the cylindrical bearing.

The stator of this motor is constituted by the base with the coil and the two polar plates. The two polar plates have 90° polar difference, or vertical to each other in the polar position. When the coil is electrified to generate magnetism, the metal cylinder can generate magnetic field with help of the magnetic polar plates so that the shaft of the rotor can be rotated.

BRIEF DESCRIPTION OF THE DRAWINGS

This invention will now be described in detail with reference to the accompanying drawings wherein.

DETAILED DESCRIPTION OF THE INVENTION

Figure 1:
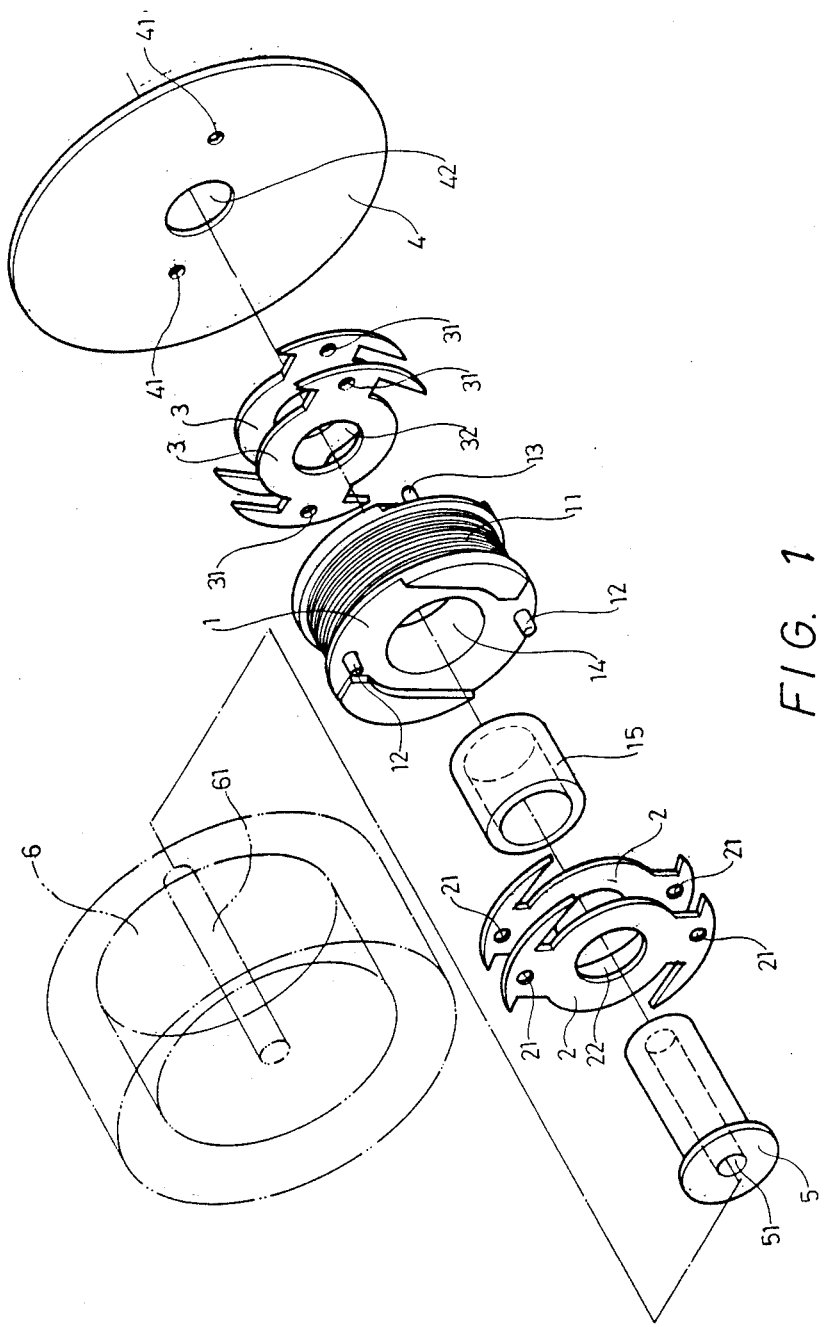
FIG. 1 is an exploded perspective view of the non-brush D.C. motor in accordance with the present invention.

This non-brush D.C. motor, as shown in FIG. 1, comprises a base 1 made of plastics having its circumference wound around by a coil 11, and combined with two magnetic polar plates 2, 3. The base 1 functions as the stator in this motor.

The base 1 made of plastics has a round outer circumference wound by the coil 11, and two sets of two feet 12, 13 symmetrically protruding out of both sides and the feet 13 passing through two holes 31 in the right magnetic polar plate 3 and then through holes 41 in a circuit board 4. Then the base 1 is firmly assembled together with the magnetic polar plate 3 and the circuit board 4 by means of the feet 13 extending out of the holes 41 and being pressed on the board 4. In the similar way, the feet 12 pass through round holes 21 in the magnetic polar plate 2 to combine it with the base 1. The base 1 is also provided with a round opening 14 for receiving therein a metal cylinder 15 to generate a magnetic field for rotating the rotor 6 with cooperation of the coil 11 and the two magnetic polar plates 2, 3. The metal cylinder 15 contains a cylindrical bearing 5 having a shaft hole 51 for the shaft 61 of the rotor 6 to pass through and to rotate therein, which constitutes the assembling of the rotor 6 and the base 1 functioning as the stator.

Next, the magnetic polar plates 2, 3 are made of silicon steel, provided with comparatively large openings 22, 32 for the bearing 5 to pass through, two holes 21, 31 bored symmetrically at the opposite sides for the feet 12, 13 of the base 1 to pass through in assembling the two magnetic polar plates 2, 3 respectively on both sides of the base 1. The left polar plate 2 and the right polar plate 3 both consist of two pieces put together and they have a 90° difference in their polar position, in other words, perpendicular to each other in their relative polar orientation.

The circuit board 4 is to be arranged thereon with electronic components for starting the motor, and they are all the same as used in a conventional motor and omitted here and in the figures. The circuit board 4 is provided with a central large opening 42 to correspond with round openings 22, 32 in the magnetic polar plates 2, 3 and the large opening 14 in the base 1 for the bearing 5 to pass through. The board 4 is also provided with two small holes 41 symmetrically near the central opening 42 to correspond with the round holes 31 in the magnetic polar plate 3 for the feet 13 to pass through in assembling the board 4 with the base 1.

Figure 2:
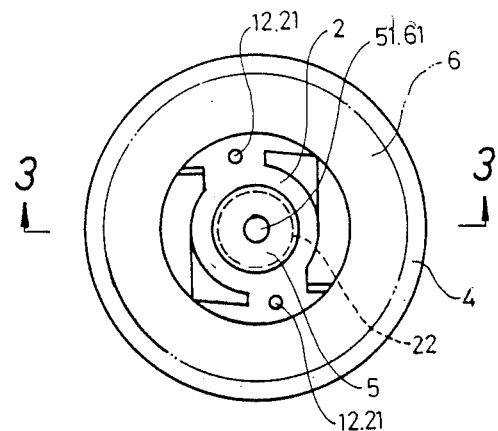
FIG. 2 is a top plan view of the non-brush D.C. motor in accordance with the present invention.
Figure 3:
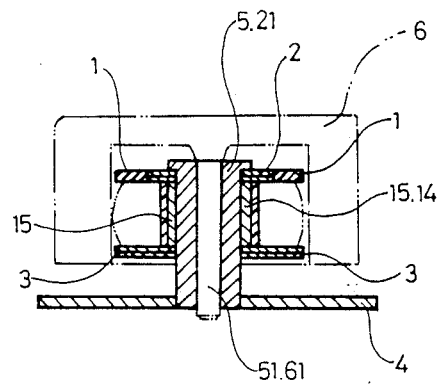
FIG. 3 is a cross sectional view taken along line 3—3 of FIG. 2.

As shown in FIGS. 2, 3, the base 1 together with the two magnetic polar plates 2, 3 take the place of a stator, functioning as a conventional stator, but its structure is evidently more simple and its dimension comparatively smaller as well than a conventional one. Also, there can never occur environmental pollution in its manufacturing process without using varnish for insulation, in addition to the advantage of cheaper cost and easy assembling.

What is claimed is:

1. A brushless D.C. motor comprising a rotor, a shaft for the rotor, a circuit board, and a stator which comprises a base of plastic material having an outer round circumference and a pair of opposite circular sides with a pair of feet extending from each side and a central opening housing a metal cylinder, the metal cylinder having a central opening, a cylindrical bearing passing through the central opening of the metal cylinder and having a central shaft opening with the shaft of the rotor disposed for rotation therein and a pair of magnetic polar plates at each of the opposite circular sides of the base, each polar plate of each pair having an inner circular portion and two substantially diametrically oppositely positioned outer portions comprising oppositely directed leg-type extensions spaced from said central portion and each extension having a radially outer edge forming a part of the outer peripheral edge of the polar plate and an inner substantially straight edge spaced from the inner circular portion to form a gap therebetween, polar plate receiving slots in the outer surface of said circular sides extending at right angles relative to each other, at least one of said polar plates of each pair of polar plates being fitted in a respective one of said slots, the pairs of plates being arranged so that their polar axes are at right angles to each other, the circuit board being located on one of the circular sides of the base with one pair of said polar plates located between the one circular side and the circuit board, the stator being held together by the feet extending from both sides of the base and extending through holes in the polar plates and in the circuit board.

* * * * *